Patented May 3, 1938

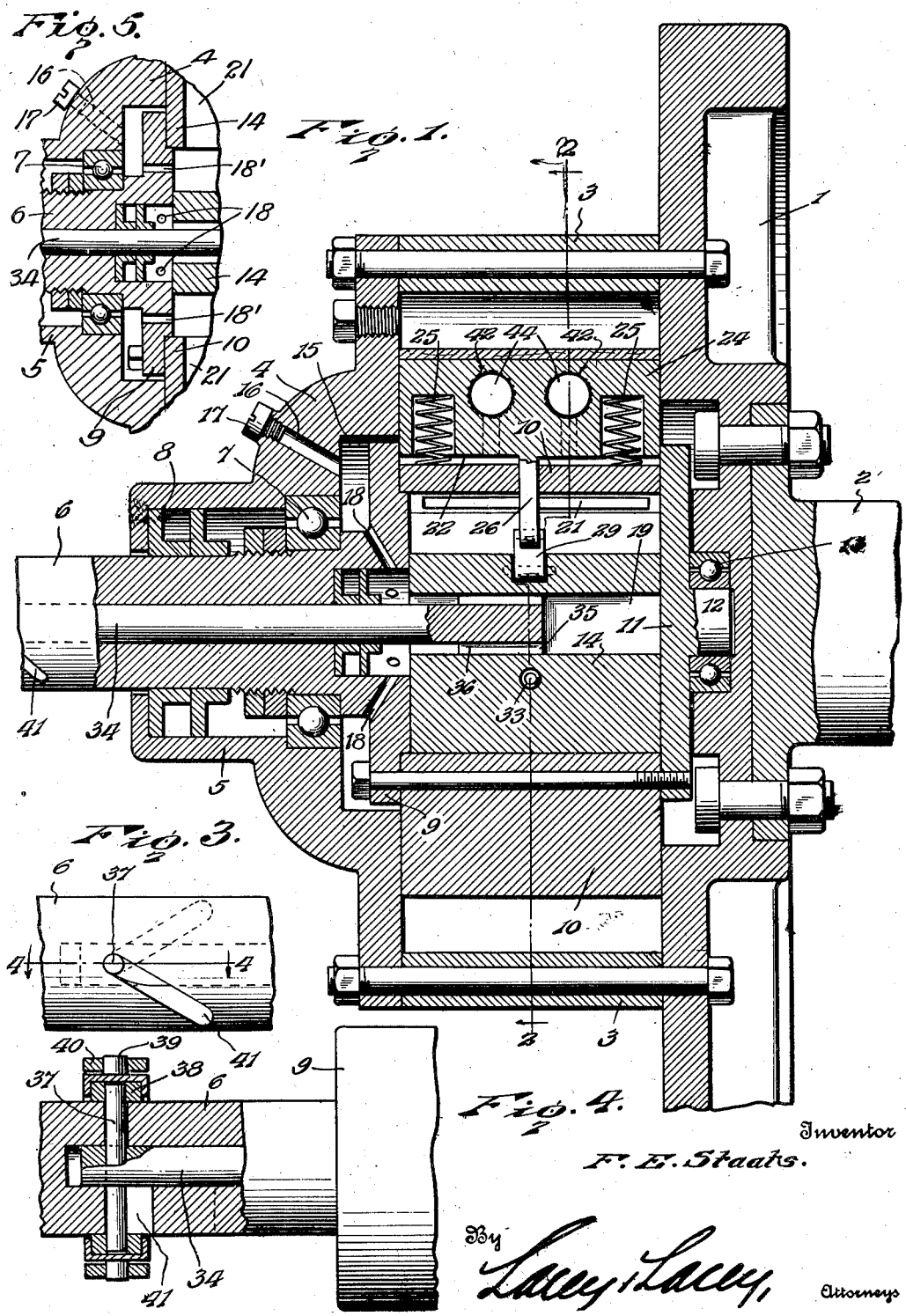

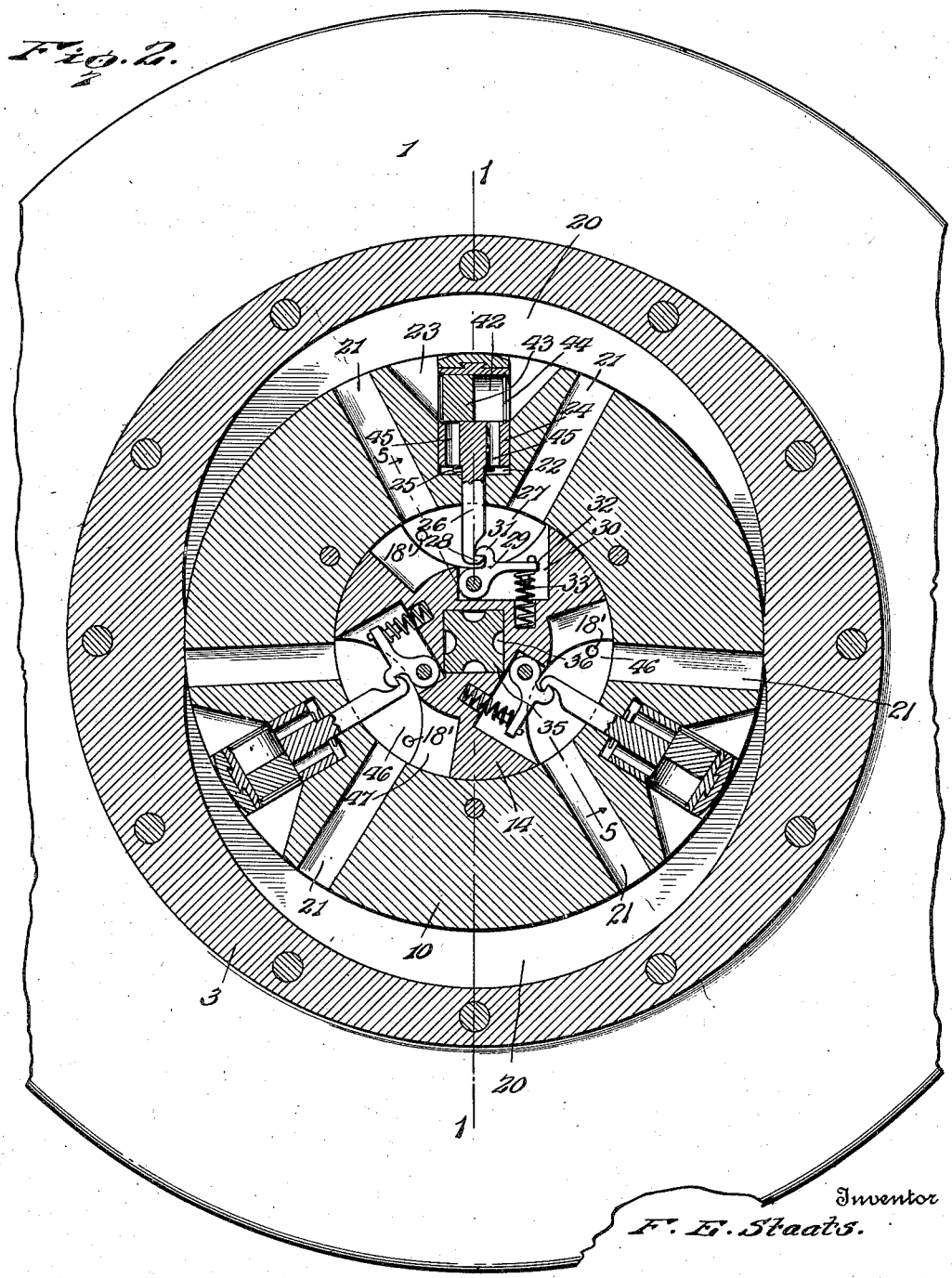

2,116,049

UNITED STATES PATENT OFFICE 2,116,049

HYDRAULIC CLUTCH

Franklin E. Staats, Peoria, Ill., assignor to Staats Hydraulic Appliance, Inc., Peoria, Ill., a corporation of Illinois Application April 25, 1934, Serial No. 722,378

14 Claims. (Cl. 192—58)

This invention relates to hydraulic clutches and has for its object the provision of means whereby a driving member may be engaged with a driven member without any jarring or grinding action so that the actuation of the driven member will be accomplished easily and smoothly. The invention is illustrated in the accompanying drawings and consists in certain novel features which will be hereinafter first fully described and then particularly defined.

In the drawings:

Figure 1 is a longitudinal section of a hydraulic clutch embodying the present improvements, the view being taken along the line 1—1 of Figure 2.

Figure 2 is a transverse section on the line 2—2 of Figure 1.

Figure 3 is a detail elevation.

Figure 4 is a detail section on the line 4—4 of Figure 3.

Figure 5 is a partial section taken along the line 5—5 of Figure 2.

In the drawings, the reference numeral 1 indicates a flywheel which is rigidly secured to a driving shaft 2 in any convenient or preferred manner, the shaft 2 being the shaft of an internal combustion engine or any other form of prime motor. A circular casing 3 is secured rigidly to the side of the flywheel opposite the driving shaft and the side of the casing remote from the flywheel is closed by a side plate or wall 4, as clearly shown. A boss 5 is formed on the outer side of the side plate 4 and the driven shaft 6 is journaled in and extends from this boss, as shown in Figure 1, anti-friction bearings 7 being provided between the shaft and the circular wall of the bore and sealing rings 8 being also fitted in the boss around the shaft, as clearly shown. The inner end of the driven shaft is formed into a head 9 which is bolted or otherwise secured to a rotor 10, a bearing plate 11 being secured to the side of the rotor remote from the head 9 and formed with a stud 12 rotatably mounted in bearings 13 which are fitted in a recess provided therefor at the center of the flywheel, as clearly shown. The rotor is formed with a central circular chamber, and a valve body 14 of circular cross section is rotatably mounted in said chamber. The head 9, on the driven shaft, is housed within a circular chamber or recess 15 formed in the boss or offset 4 and through said boss is formed a filling opening 16 through which oil or other non-compressible fluid may be poured into said chamber. A closing plug 17 is engaged in the outer end of the filling opening 16 so that after the clutch has been filled with the fluid, the filling opening may be closed and loss of the fluid thereby prevented. A plurality of passages 18 and 18' are formed through the head 9 and these passages direct the oil into the valve chamber and the passages leading to and from the valve chamber, as well as to a central passage 19 formed in the valve body 14.

The ports 18 and 18' serve to permit filling of the device with liquid. The ports 18' lead to the valve chambers proper and the remaining ports 18 lead to the central chamber. When the valve is open, as shown in the upper portion of Fig. 1, the ports are uncovered and liquid may flow from one chamber to another through the ports. When the valve 14 is closed, however, its end covers the port 18' leading into the valve chamber and since the valve is so formed that it defines three duplicate segments, as shown in Fig. 2, one for each set of ports 21 associated with each plunger assembly, there can be no communication through the ports either into or out of any valve chamber when the valve is closed. Furthermore, there is no communication from the central chamber 19 to any plunger assembly, except through the ports 18. Thus it will be seen that, when the valve 14 is closed, the ports 18' are blocked by the valve itself and there can be no flow of liquid either to or from any valve chamber through the ports 18', and neither can liquid flow from any chamber to any other chamber by way of these ports. The longitudinal ports 18' are located immediately in advance of their respective valve assembly so that the first movement of the valve serves to block the ports 18' and at the same time the plungers 24 are released from the latches 29, all of this occurring before the valve 14 encroaches upon the first of the ports or passages 21 which it is designed to close. In other words, the closing of the longitudinal ports 18 and the releasing of the plungers 24 occur with the initial movement of the valve and simultaneously, in so far as simultaneous action can be held to occur where the release of the plunger is instantaneous while the covering of the port 18 necessarily takes sufficient time to move the section of the valve 14 the length of the diameter of the port 18'. The important thing, however, is that both of these operations occur before the passage 21 is even partially closed. Continuation of the movement of the valve 14 across the passage 21 closes the passage by degrees, resulting in the constant narrowing of the opening through which the fluid in the chamber 20 must pass in order to relieve the pressure against the plunger head. As this opening is decreased in size, the pressure will become greater, resulting in the movement of the driven member at graduated and increasing speeds until such time as the passages 21 are completely closed and full pressure of the driving member is exerted against the plunger head in the driven member. It is understood, of course, that throttling movement consists of closing the valve to gradually cut off flow through the passages 21.

The inner wall of the casing 3 is non-circular or eccentric to the rotor so that between the rotor and said wall, cam chambers 20 will be defined, as shown in Figure 2, and through the rotor are formed radial passages 21 which establish communication between the cam chambers and the valve chamber, as will be understood upon reference to Figure 2. It will be noted that the passages 21 are arranged in pairs and between the passages of each pair a radial chamber or cylinder 22 is formed in the rotor and extends the entire width thereof, the outer end portion of said cylinder or chamber being flared to provide a wide mouth or flared portion midway the width of the rotor, as shown in full lines in Figure 2 and indicated by dotted lines in Figure 1. Slidably mounted within each cylinder or chamber 22 is a plunger 24 which, at times, is housed within the rotor, as shown in the drawings, and, at times, may be projected beyond the rotor so as to ride upon the inner wall of the casing. The plunger extends between the flywheel and the side plate 4 and is formed adjacent its ends with sockets or recesses to accommodate expansion springs 25, as shown clearly in Figure 1, said springs bearing, at their outer ends, against the end walls of the sockets and, at their inner ends, against the inner wall of the cylinder. The springs will tend constantly to project the plungers beyond the rotor and when the parts are in the neutral or inoperative position shown in Figure 2, the plungers will be held retracted by means acting against the springs and holding the plungers in a restricted condition. Extending radially inward from each plunger is a central stem 26 which projects into a chamber or passage 27 in the valve body 14 and has its inner end formed into a hook, as shown at 28, adapted to be engaged by a latch 29 carried by the valve body. The latch 29 is pivotally mounted within a chamber 30 provided therefor in the valve body and is formed with a hook 31 adapted to engage over the hook 28 and also provided with a finger 32 extending laterally with respect to the stem 26 and resting upon a spring 33 which holds the latch constantly in position to be engaged by the stem. When the plunger moves radially inward, the side of the hook 28 will ride upon the hook 31 and push the same aside until the bills of the hooks clear, whereupon the latch will be actuated by the spring 33 to cause the hooks to engage, as shown in Figure 2, and thereby hold the plunger in the retracted position. In order to release the latch from the stem and permit the plungers to be projected, I provide a controlling rod 34 which is slidably mounted in the driven shaft 6 and extends into the central passage 19 of the valve. This rod 34 is provided at its inner end with a head 35 which, as clearly shown in Figure 2, is of angular cross section and conforms to the cross section of the bore 19 in the valve so that if the controlling rod be rotated relative to the shaft 6, the valve body will be rotated and the latches 29 thereby carried out of engagement with the stems 26 or turned to such a position that they may engage the stems, as will be understood. The head 35 is provided with longitudinal grooves 36 in its sides to permit a relative flow of oil between the ends of the bore or passage 19 so that the head will be lubricated in the valve body and may work easily at all times. The rod 34 is of circular cross section so that it may rotate relative to the shaft 6, as will be understood upon reference to Figures 1 and 4, and through the outer end of the rod there is fitted diametrically a pin 37 which extends through the shaft and has its projecting ends fitted in an annular groove in a ring 38 which encircles the shaft. The ring 38 is provided with trunnions 39 engaged in a fork, indicated at 40, carried by a hand lever or a foot pedal so that the controlling rod may be caused to slide in or out, as will be understood. Oppositely located slots 41 are formed in the sides of the shaft and, as indicated by the full and dotted lines in Figure 3, the slots at the opposite sides of the shaft diverge from the outer position of the pin 37 so that as the rod is pushed inwardly it will also be rotated relative to the shaft through the engagement of the pin in said slots and, consequently, the valve body will be rotated so as to release or engage the latches.

The plungers 24 are provided adjacent their outer ends with the diametrical passages 42 into which oil may enter through the flared ends 23 of the cylinders and sliding valves 43 are mounted in said passages and are driven between the ends of the passages by the pressure of the oil according to the direction in which the driver is rotated. Stops, indicated at 44, are provided at the ends of the passage 42 to limit the movement of the valve. Through the plunger are formed passages 45 which establish communication between the inner end of the cylinder behind the plunger and the passage 42, as will be understood upon reference to Figure 2. It will now be understood that the liquid pressure will flow through the flared end of the cylinder, the passage 42 and a passage 45 to exert pressure or stress upon the inner end of the plunger so as to hold it in its projected position. From the above it will be seen that each plunger is provided with a stress passage consisting of the chamber 23, the ports 44, the passages 42 and 45, movement of liquid through the stress passage being controlled by the sliding valves 43. The stress passage serves to provide fluid pressure beneath the plunger head and force or stress the head outwardly against the opposing surface of the cam chamber. The valves 43 move from one side to the other of the plunger and are propelled by liquid from the pressure side of the plunger. Thus, when the plunger is extended, the chambers 42 are always on the pressure side of the plunger and are filled with fluid from the cam chamber on that side. The pressure from the liquid in the chamber is, therefore, exerted outwardly on the plunger head and serves to stress the plunger head against the opposing face of the cam chamber, thereby effecting a seal between the plunger head and the outer surface of the cam chamber and preventing escape of fluid over the plunger head from the pressure side to the non-pressure side of the cam chamber or plunger. Channels or chambers 46 are formed in the circumferential surface of the valve body and, in the neutral or open position of the parts illustrated in Figure 2, these several chambers or channels will establish communication between the inner ends of the adjacent passages 21 so that the fluid will be bypassed around the plungers. At what may be called the trailing end of each chamber or channel 46 is a recess 47 which will receive the end of the stem 26 when the parts are set to release the stem and close the bypass.

It is thought the operation will be readily understood. With the parts in the idling position shown in Figure 2, the drive shaft may be rotated but since the plungers are in the retracted position the casing will be free to turn about the rotor without the oil in the casing acting upon the plungers to impart rotation to the rotor and the driven shaft. Some slight motion may be imparted to the driven rotor at this time and when sufficient momentum has been acquired by the driver, the controlling rod 34 may be pushed inwardly and the valve body, consequently, turned, as has been described, so that the latches will be carried out of engagement with the stems 26 and the channels 46 and recesses 47 will be carried beyond the inner ends of some of the passages 21 so that said passages 21 will be closed by the valve body to the circulation of the liquid or transmission of pressure from one plunger assembly to another. The release of the latches from the stems will permit the stems and the plungers to move outwardly under the influence of the springs 25 so that the plungers will be projected across the cam chambers and will ride on the inner surface of the casing. The oil will then be admitted in increased volume to the inner ends of the cylinders 22 and will act on the inner ends of the plungers to hold them in engagement with the casing and across the cam chambers. Inasmuch as, at this time, the oil is cut off from the passages 18' and 21, the pressure of the oil will be applied directly and independently to the plungers so that they will have to turn with the casing and the rotor will be set in motion, transmitting rotation directly to the driven shaft 6. It should also be noted that when the rotary valve 14 has throttling movement imparted to it for closing the passages 18' and 21 it not only prevents circulation of liquid but also prevents transmission of pressure from the liquid associated with one plunger to that associated with another plunger during throttling movement, and pulsations, consequently, cannot be transmitted from one body of liquid to another. When it is desired to open the clutch and arrest the motion of the driven shaft, the controlling rod 34 is moved outwardly so that the valve body 14 will be returned to the position shown in Figure 2. The several latches will then be in position to engage the stems and, as the rotation of the driver continues, the high parts of the cam surface will be caused to ride successively upon the outer ends of the several plungers and thereby force them inwardly so that the stems will be engaged and held by the latches. The engine may then be permitted to run idly or may be entirely cut off so that no further motion will be transmitted to the driven shaft until the plungers are again projected. The engagement of the plungers with the cam surfaces of the casing will be effected quietly and smoothly and the pressure of the liquid will hold them in firm engagement with the driver when they are projected.

Having thus described the invention, I claim:

1. In a hydraulic clutch, a driving member including a casing having an eccentric inner surface, a rotor mounted concentrically in the casing, plungers mounted radially in the rotor and adapted to be projected to engage the eccentric surface of the driving member, the rotor being provided with passages at the sides of the plunger communicating with the space between the rotor and the driving member and other passages directing liquid to the inner ends of the plungers from the space between the rotor and the driving member, and a valve rotatably mounted centrally within the rotor and provided with channels adapted to connect the inner ends of the passages at the opposite sides of the plungers and with intervening portions adapted to cover some of said passages.

2. A hydraulic clutch comprising a driving member including a casing having an eccentric inner wall, a rotor mounted concentrically within said casing, plungers mounted radially in the rotor, means whereby hydraulic pressure may be exerted upon the inner ends of the plungers to hold them against the eccentric surface of the casing, a valve body rotatably mounted in the rotor at the center thereof and adapted to bypass the liquid around the plungers or to cut off the circulation of the liquid whereby it will exert pressure against the plungers to rotate the rotor, stems projecting inwardly from the several plungers and accommodated within the valve, and latches pivotally mounted in the valve to engage said stems whereby to retain the plungers in retracted position.

3. In a hydraulic clutch, a driving member including a casing having an eccentric inner surface, a rotor mounted concentrically within the casing and defining, with said eccentric surface, cam chambers, the rotor being provided with passages for circulation of liquid through the cam chambers, plungers radially mounted in the rotor, the rotor being provided with passages to direct liquid from the cam chambers to the inner ends of the plungers whereby to hold the plungers against the eccentric surface of the casing, a valve body rotatably mounted at the center of the rotor, said valve body being provided with passages adapted to bypass the liquid around the plungers, means on said valve for retaining the plungers in retracted position, said valve having a bore of non-circular cross section, a driven shaft secured to and extending axially from the rotor, a controlling rod slidably mounted in said shaft, a head on the inner end of said rod fitting slidably within the bore of the valve and having the same cross sectional contour, and projections on the inner end of the controlling rod to be engaged by a setting element, the driven shaft being provided with divergent slots engaging said projections whereby as the rod is pushed in or out it will be rotated and the valve body will be turned to release or engage the plungers and to open or close the bypass around the plungers.

4. A hydraulic clutch comprising a casing having an eccentric inner wall, a rotor mounted concentrically in the casing and provided with radial chambers having flared outer ends and passages at the sides of said chambers extending from the edge of the rotor to the center thereof, cam chambers being defined by and between the rotor and the casing to receive a non-compressible fluid, plungers mounted in the radial chambers and each provided with a transverse passage near its outer end and longitudinal passages extending from said transverse passage to the inner end of the plunger, a free valve in the transverse passage to cover one longitudinal passage and clear the other longitudinal passage, and a valve mounted centrally in the rotor and having channels to connect the adjacent passages in the rotor and intermediate surfaces to block said passages and prevent transmission of pressure from liquid associated with one plunger to that associated with another during throttling of the valve.

5. A hydraulic clutch comprising a casing having an eccentric inner wall, an annular rotor mounted concentrically in the casing whereby cam chambers are defined between the rotor and the casing to receive non-compressible fluid, plungers mounted radially in the rotor and having stems projecting into the central area thereof, bypass passages in the rotor at the sides of the plungers, means for directing fluid against the inner ends of the plungers, a valve mounted centrally in the rotor and having channels to connect the bypass passages of the rotor and intermediate surfaces to block said passages and prevent transmission of pressure from liquid asciated with one plunger to that associated with another plunger, said valve having recesses adjacent the channels to accommodate the plunger stems when the bypass passages are closed, latches pivoted on the valve to engage the plunger stems and hold the plungers retracted when the bypasses are open, and means on the valve for holding the latches yieldably to the plunger stems.

6. A hydraulic clutch comprising a casing, a rotor mounted within said casing and being so arranged and constructed as to form therebetween chambers having cam surfaces, passages communicating with said chambers, plungers mounted in the rotor, and adjustable means having means so arranged and constructed as to bypass the liquid through the passages around the plungers and to throttle or cut off the circulation of the liquid whereby it will exert pressure against the plungers to hold the plungers in extended positions against the cam surfaces to cause the rotor and casing to rotate together, said adjustable means being so constructed and arranged as to prevent the transmission of liquid associated with one plunger to that associated with another during throttling or closing movement of said adjustable means.

7. In a hydraulic clutch, a casing, a rotor mounted concentrically in the casing and being so arranged and constructed as to form therebetween chambers having cam surfaces, plungers mounted radially in the rotor and adapted to be projected to engage the cam surfaces of the chambers to cause the rotor and the casing to rotate together, passages in the rotor providing circulation of liquid between the chambers and the inner part of the rotor to bypass the liquid around the plungers and to direct the flow of the liquid from the cam chambers to the inner ends of the plungers, a valve in the rotor, means for setting the valve, said valve being so constructed and arranged as to connect the passages in the rotor or to throttle or close said passages, said valve being so constructed and arranged as to prevent the transmission of liquid associated with one plunger to that associated with another during throttling or closing movement of said valve.

8. In a hydraulic clutch, a casing having an eccentric inner surface, a rotor in the casing, plungers mounted in the rotor and adapted to be projected to engage the eccentric surface of the casing, the rotor being provided with passages at the sides of the plungers and communicating with the space between the rotor and the inner surface of the casing and with other passages communicating with said space and directing liquid to the inner ends of the plungers to hold them in engaging relation to said eccentric inner surface so that when the rotor or the casing is rotated the other will also rotate, and an adjustable valve mounted within the rotor and being so arranged and constructed as to connect the inner ends of the first named passages and also adapted to regulate the flow of liquid between them, said valve being so arranged and constructed as to prevent the transmission of liquid associated with one plunger to that of another during the adjustment of the valve.

9. A hydraulic clutch comprising a casing, a rotor mounted for rotation within said casing and being so constructed and arranged as to form cam chambers having eccentric peripheral surfaces, plungers mounted in the rotor and adapted for slidable engagement against the eccentric surfaces of said cam chambers, passages communicating with said chambers and with the inner sides of said plungers, and adjustable means being so arranged and constructed as to cut off or regulate the circulation of a liquid through certain of said passages and around the plungers whereby during the rotation of the casing or rotor, or both, the projecting portions of said plungers will be held against said eccentric surfaces confining the liquid to cause the rotor and casing to rotate together or at different speeds of rotation with respect to each other for the purpose of building up and transmitting power from one to the other, said adjustable means being so arranged and constructed as to prevent transmission of liquid associated with one plunger to that associated with another during movement of said adjustable means.

10. A hydraulic clutch comprising rotatable driving and driven members having eccentric and concentric surfaces between which are defined cam chambers containing a fluid, plungers slidably mounted in one of said members and so arranged and constructed as to extend into the cam chambers and contact the eccentric surfaces, by-pass passages provided in said one member and communicating with said cam chambers at each side of each plunger, adjustable means in said one member for controlling the flow of fluid in the by-pass passages and for closing off communication and preventing transmission of pressure from the fluid associated with a plunger to that of another plunger for independent action against each plunger.

11. A hydraulic clutch comprising rotatable driving and driven members having eccentric and concentric surfaces between which are defined cam chambers containing a fluid, plungers slidably mounted in one of said members and so arranged and constructed as to extend into the cam chambers and to contact the eccentric cam surfaces, by-pass passages provided in said one member around the plungers and communicating with the cam chambers at each side of each plunger, adjustable means in said one member for controlling the flow of fluid in the by-pass passages, stress passages in communication with said by-pass passages when the members are in non-clutching relation, and means for shutting off the stress passages when the adjustable means is operated to control the by-pass passages so as to prevent transmission of fluid pressure from the fluid associated with a plunger to the fluid associated with another plunger.

12. A hydraulic clutch comprising rotatable driving and driven members having eccentric and concentric cam surfaces between which are defined cam chambers containing a fluid, plunger chambers provided in one of said members, plungers slidably mounted in said plunger chambers and so arranged and constructed as to extend into the cam chambers and to contact the eccentric cam surfaces, stress passages in said one member and in communication with said plunger chamber at the rear of said plungers and with said cam chambers for the fluid to stress said plungers into contact with said cam surfaces, by-pass passages provided in said one member around the plungers and communicating with the cam chambers at each side of each plunger, adjustable means in said member for controlling the flow of fluid in the by-pass passages, and means for shutting off the said stress passages when the valve is operated to control the by-pass passages so as to prevent transmission of fluid pressure from the fluid associated with a plunger to the fluid associated with another plunger.

13. In a hydraulic clutch, a driving member including a casing having an eccentric inner wall, a rotor mounted concentrically in the casing, cam members being defined between the rotor and the casing to contain a non-compressible fluid, radial chambers in the rotor having flared outer ends, plungers mounted in the said chambers and adapted to ride on the eccentric surface of the driving member, passages in the rotor to bypass the fluid around the plungers, other passages to admit fluid to the flared chambers and inner ends of the plungers for holding the plungers in projected position, yieldable means tending constantly to project the plungers, and a valve rotatably mounted centrally in the rotor and having channels to connect the bypass passages and closed surfaces to block said bypass passages and provided with means for retaining the plungers in retracted position.

14. A hydraulic clutch comprising a driving member having an eccentric inner surface, a driven member, a rotor connected to the driven member and disposed within the driving member, plungers in the rotor to bear upon the eccentric surface of the driving member, passages in the rotor for the circulation of liquid to and around the plungers, a valve in the rotor serving to bypass liquid around the plungers and adapted to throttle the passages and prevent transmission of pressure from liquid associated with one plunger to that associated with another plunger during throttling movement of the valve, and interengaging latches on the valve and the plungers to hold the plungers retracted when the valve is in bypassing position.

FRANKLIN E. STAATS.